(12) United States Patent
Trenkle et al.

(10) Patent No.: US 9,173,380 B2
(45) Date of Patent: Nov. 3, 2015

(54) ANIMAL INDICATOR APPARATUS

(71) Applicant: Garmin Switzerland GmbH, Schaffhausen (CH)

(72) Inventors: Bradley C. Trenkle, Prairie Village, KS (US); Timmy R. Walker, Prairie Village, KS (US)

(73) Assignee: Garmin Switzerland GmbH (CH)

( * ) Notice: Subject to any disclaimer, the term of this patent is extended or adjusted under 35 U.S.C. 154(b) by 334 days.

(21) Appl. No.: 13/769,562

(22) Filed: Feb. 18, 2013

(65) Prior Publication Data

US 2014/0230755 A1    Aug. 21, 2014

(51) Int. Cl.
| | |
|---|---|
| A62B 35/00 | (2006.01) |
| A01K 27/00 | (2006.01) |
| A01K 15/02 | (2006.01) |
| A01K 29/00 | (2006.01) |
| G08B 21/02 | (2006.01) |

(52) U.S. Cl.
CPC ............ *A01K 27/009* (2013.01); *A01K 15/021* (2013.01); *A01K 29/005* (2013.01); *G08B 21/0261* (2013.01); *G08B 21/0269* (2013.01)

(58) Field of Classification Search
CPC . A01K 27/006; A01K 27/009; A01K 29/005; A01K 15/021; A01K 15/02; G08B 21/18; G08B 21/0269; G08B 21/0261
USPC .................... 119/721, 908, 856, 858, 859; 340/573.3, 573.4, 362, 108
See application file for complete search history.

(56) References Cited

U.S. PATENT DOCUMENTS

| | | | | |
|---|---|---|---|---|
| 4,177,465 | A | * | 12/1979 | Lundvall et al. ............... 342/458 |
| 4,814,751 | A | * | 3/1989 | Hawkins et al. ........... 340/573.1 |
| 5,689,269 | A | * | 11/1997 | Norris ...................... 342/357.31 |
| 5,857,433 | A | | 1/1999 | Files .............................. 119/720 |
| 5,868,100 | A | * | 2/1999 | Marsh ........................... 119/421 |
| 6,067,018 | A | * | 5/2000 | Skelton et al. ............. 340/573.3 |
| 6,263,836 | B1 | * | 7/2001 | Hollis .......................... 119/712 |
| 6,362,778 | B2 | * | 3/2002 | Neher ...................... 342/357.75 |
| 7,602,302 | B2 | | 10/2009 | Hokuf et al. ............... 340/573.3 |
| 7,819,087 | B2 | | 10/2010 | Napolez et al. ............... 119/721 |
| 8,065,978 | B2 | | 11/2011 | Duncan et al. ................ 119/721 |
| 2003/0179140 | A1 | * | 9/2003 | Patterson et al. ............. 342/463 |
| 2007/0095304 | A1 | * | 5/2007 | Rosenberg et al. ........... 119/720 |

OTHER PUBLICATIONS

Geo-fence from Wikipedia, published prior to Feb. 18, 2013.
Gundogsupply.com review of SportDOG TEK, published prior to Feb. 18, 2013.
U.S. Appl. No. 13/769,556, filed Feb. 18, 2013.

* cited by examiner

*Primary Examiner* — Rob Swiatek
*Assistant Examiner* — Ebony Evans
(74) *Attorney, Agent, or Firm* — Samuel M. Korte; Maxwell M. Ali

(57) ABSTRACT

An animal indicator apparatus that tracks the locations of an animal and alerts nearby persons when the animal approaches a boundary includes a location determining component operable to determine a current geographic location of the apparatus; memory for storing cartographic data representative of at least one boundary; an indicator and a processor. The processor triggers the indicator when the current geographic location of the apparatus is near the location of the boundary.

26 Claims, 6 Drawing Sheets

ANIMAL INDICATOR APPARATUS

BACKGROUND

It is often desirable to track animals for training purposes and/or to ensure they do not get lost or otherwise harmed. For instance, hunting dogs are often equipped with tracking devices that communicate with handheld remotes so that handlers may monitor the dogs' locations while hunting or training.

SUMMARY

Embodiments of the present invention provide an improved animal indicator apparatus that tracks the locations of an animal and alerts nearby persons when the animal approaches a boundary. An embodiment of the indicator apparatus is configured to be worn by a dog or other animal and generally includes a location determining component operable to determine a current geographic location of the apparatus; memory for storing cartographic data representative of at least one boundary; an indicator; and a processor. The processor triggers the indicator when the current geographic location of the apparatus approaches the location of the boundary. For example, the boundary may be a road or parking lot, and the indicator may be a light emitting device. The processor may trigger the light emitting device whenever the animal wearing the indicator apparatus approaches the road or parking lot to alert motorists and other nearby persons of the presence of the animal.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

Figure 1:
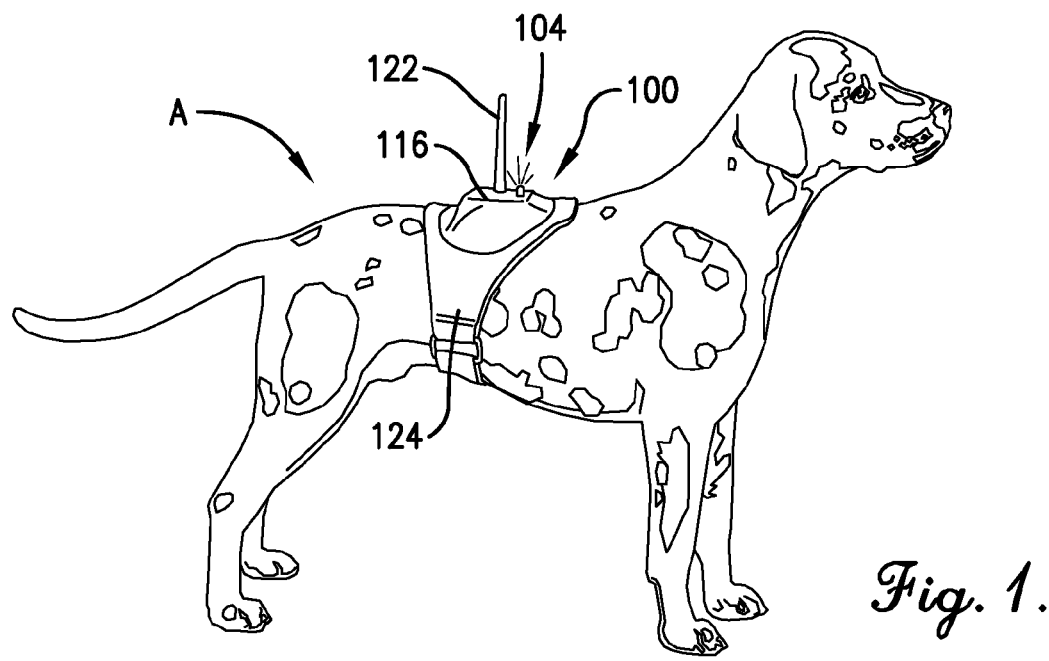
FIG. 1 is a perspective view of an animal indicator apparatus configured in accordance with various embodiments of the present invention shown coupled to a dog with a body harness.

The drawing figures do not limit the present technology to the specific embodiments disclosed and described herein. The drawings are not necessarily to scale, emphasis instead being placed upon clearly illustrating the principles of the technology.

Detailed Description

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to one embodiment, an embodiment, or embodiments mean that the feature or features being referred to are included in at least one embodiment of the technology. Separate references to one embodiment, an embodiment, or embodiments in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
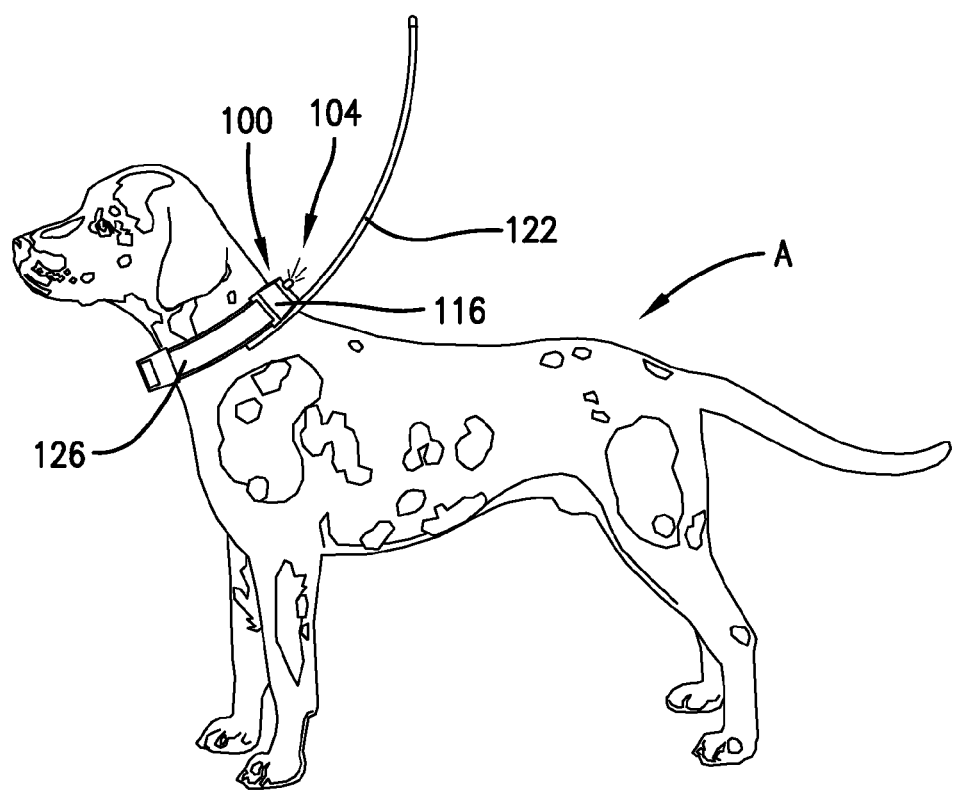
FIG. 2 is a perspective view showing an embodiment of the indicator apparatus coupled to a dog with a dog collar.
Figure 6:
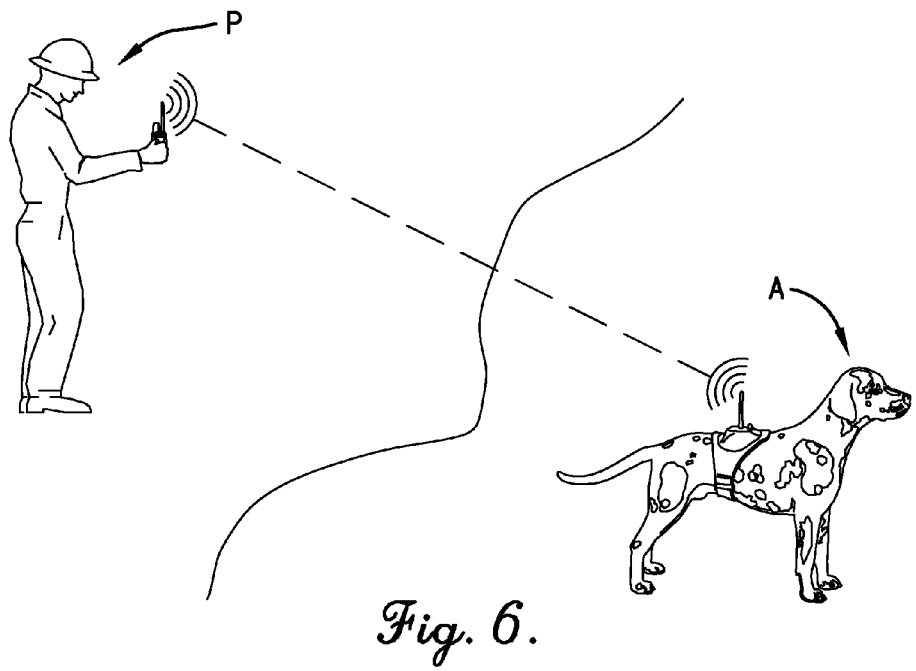
FIG. 6 is a schematic diagram showing a person using the navigation unit to communicate with the indicator apparatus.

Embodiments of the present invention may be implemented with an animal indicator apparatus 100 shown in FIGS. 1 and 2. In some configurations, the animal indicator apparatus 100 may be coupled with a portable navigation unit 200 shown in FIG. 3. As shown in FIG. 6, the animal indicator apparatus 100 may be worn by or otherwise attached to a dog or other animal A, and the portable navigation unit 200 may be used by an owner of the animal, a trainer, or other person P.

As described in more detail below, the indicator apparatus 100 tracks the locations of an animal and alerts motorists and other nearby persons when the animal approaches a boundary. For example, the indicator apparatus may include a light emitting device that is triggered whenever the animal indicator apparatus approaches a road, parking lot, or other boundary to alert motorists and other nearby persons of the presence of the animal. The alerted motorists and other persons may thereby take appropriate action regarding the animal.

Embodiments of the indicator apparatus 100 and navigation unit 200 will now be described in more detail. Referring initially to FIGS. 1, 2, 3, and 6, the indicator apparatus 100 may be any portable electronic device that can be worn by or otherwise attached to a dog or other animal A and that is operable to determine its current geographic location. Likewise the navigation unit 200 may be any portable electronic device that can communicate with the indicator apparatus 100. In some embodiments, the indicator apparatus 100 transmits the location of the animal A and other information to the portable navigation unit 200. However, the animal indicator apparatus 100 and portable navigation unit 200 are not necessarily used in combination, as the animal indicator apparatus 100 and/or portable navigation unit 200 may function and exist independently of each other. For example, in some configurations, the indicator apparatus 100 may be a stand-alone device operable to provide location-based indicating functionality without communication or reference to external devices. Such functionality may be desirable, for example, in remote areas where device-to-device communication may be difficult or impossible.

Figure 5:
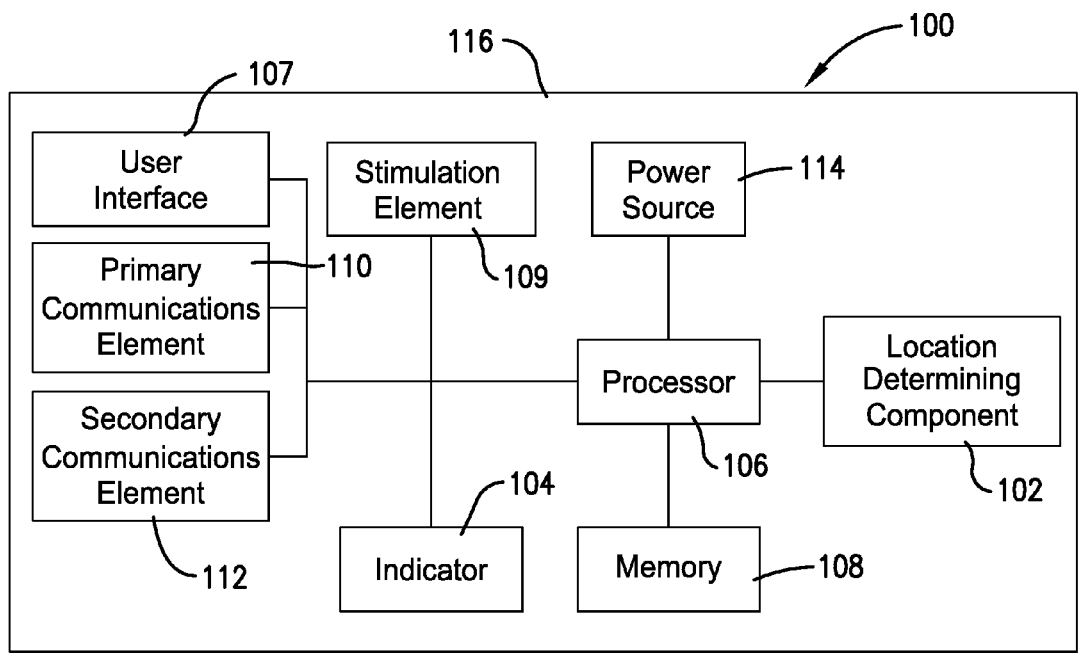
FIG. 5 is a block diagram showing some of the components of the indicator apparatus of FIG. 1 or 2.

In various embodiments, as shown in FIG. 2, the indicator apparatus 100 may be configured as an animal training collar worn about the animal's neck. However, in other configurations, the indicator apparatus 100 may be configured as a generally-conventional dog collar without stimulation, training, or wireless communication elements. A specific embodiment of the indicator apparatus 100 is shown schematically in FIG. 5 and generally includes a location determining component 102 operable to determine a current geographic location of the apparatus; an indicator 104 that may be triggered to alert nearby persons of the presence of the animal; a processor 106 coupled with the location determining component and the indicator; and memory 108 coupled with the processor 106. The indicator apparatus may also include, or be connected with, a stimulation element 109, a primary communications element 110, a secondary communications element 112, a power source 114 for powering the components of the apparatus 100, and a housing 116 for housing or supporting the components of the apparatus 100.

Figure 7:
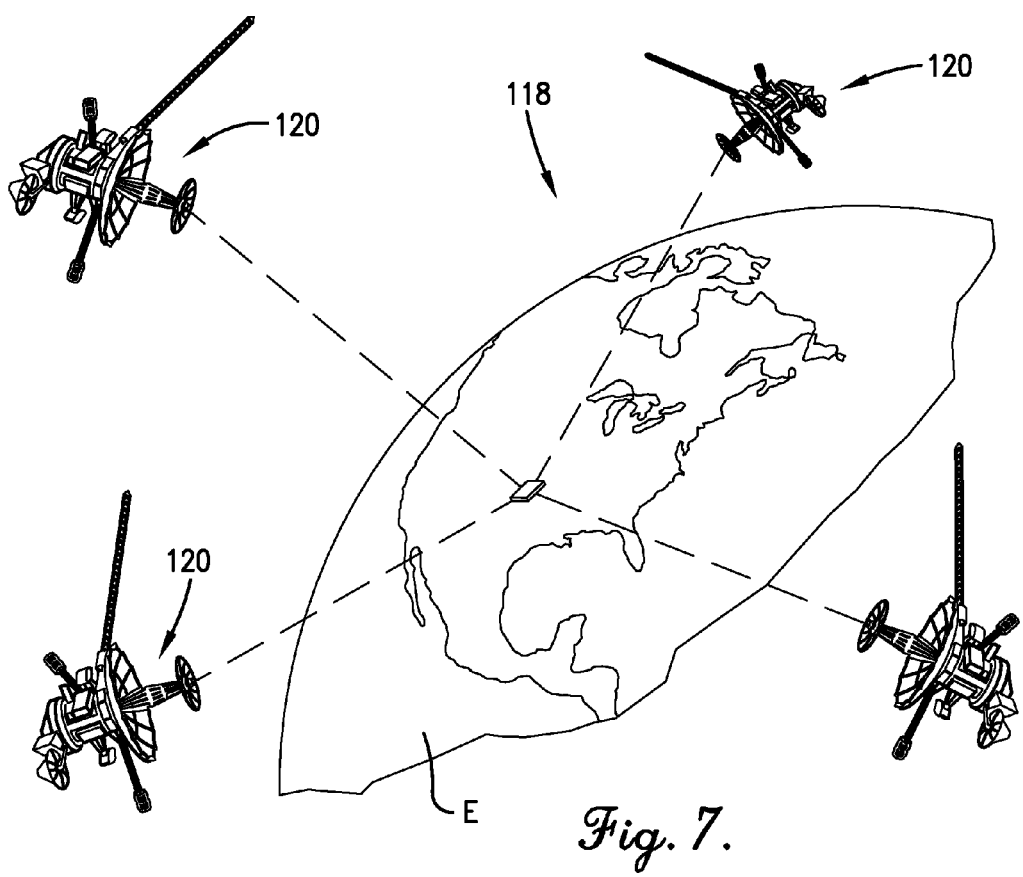
FIG. 7 is schematic diagram of a Global Positioning System (GPS) that may be used by various embodiments of the invention.

The location determining component 102 may be a Global Navigation Satellite System (GNSS) receiver such as a Global Positioning System (GPS) receiver, a GLONASS receiver, a Galileo receiver, or a similar device and is adapted to provide, in a substantially conventional manner, geographic location information for the indicator apparatus 100. In some configurations, the GNSS receiver may be configured to receive signals from a plurality of satellite constellations, such as both GPS and GLONASS. The location determining component 102 may be, for example, a GPS receiver much like those disclosed in U.S. Pat. No. 6,434,485, which is incorporated herein in its entirety by specific reference. In some embodiments, the location determining component 102 may include a high sensitivity GPS receiver to facilitate determination of the geographic locations of the apparatus 100 when the apparatus 100 is shielded from the sky, such as where the apparatus 100 is in heavy tree cover or brush. However, the location determining component 102 may receive cellular or other positioning signals utilizing other various methods to facilitate determination of geographic locations without being limited to GNSS The GPS is a satellite-based radio navigation system that allows determination of navigation information, such as position, velocity, time, and direction, for an unlimited number of users. Formally known as NAVSTAR, the GPS incorporates a plurality of satellites that orbit the earth. FIG. 7 shows one representative view of a GPS denoted generally by reference number 118. A plurality of satellites 120 are in orbit about the Earth E. The orbit of each satellite is not necessarily synchronous with the orbits of other satellites and, in fact, is likely asynchronous. The indicator apparatus 100, including the location determining component 102, is shown receiving GPS satellite signals from the various satellites 120.

The location determining component 102 may also include various processing and memory elements to determine the geographic location of the indicator apparatus 100 itself or it may provide information to the processor 106 to enable the processor 106 to determine the geographic location of the indicator apparatus 100. Thus, the location determining component 102 need not itself calculate the current geographic location of the indicator apparatus 100 based upon received signals. The location determining component 102 also may include an antenna for receiving signals, such as a GPS patch antenna or quadrifilar helical antenna. The antenna utilized by the location determining component 102 may be enclosed within the housing 116.

The location determining component 102 may be integral with the processor 106 and/or the memory 108 such that the location determining component 102 may be operable to perform the various functions described herein. Thus, the processor 106 and location determining component 102 need not be separate or otherwise discrete elements.

The location determining component 102 need not directly determine the current geographic location of the indicator apparatus 100. For instance, the location determining component 102 may determine the current geographic location by receiving information or data utilizing the communications elements 110, 112.

In various configurations, the indicator apparatus 100 may include one or more sensors to sense conditions such as speed, acceleration, velocity, temperature, orientation, attitude, humidity, sound, light, combinations thereof, and the like. The one or more sensors may be configured to determine a gait or position of the animal. For example, the processor 106 may use information provided by the one or more sensors to determine if the animal is barking, upright, running, walking, prone, treeing an animal, and the like. Additionally or alternatively, information from the sensors may be provided to the navigation unit 200 for analysis and/or display.

The indicator 104 may be any device capable of drawing attention to the indicator apparatus 100 and hence the animal A wearing the indicator apparatus 100.

In one embodiment, the indicator 104 includes a light-emitting device consisting of one or more high intensity light-emitting diodes or other lights. The light emitting device may emit a single color light or multiple colors. In some embodiments, the processor 106 and/or other circuitry can alter the color, intensity, and/or duty cycle of the light-emitting device as described in more detail below.

The indicator 104 may also include an audible device such as a horn, speaker, or alarm or a combination of a light-emitting device and an audible device. The indicator 104 may include any number and/or combination of devices that can alert nearby persons of the presence of the indicator apparatus and hence the animal wearing the indicator apparatus.

The indicator 104 may be positioned anywhere on the indicator apparatus 100 such that it can be easily seen, heard, or otherwise observed by nearby persons. For example, when the sensor includes a light-emitting device, it may be mounted on top of the housing 116 and may protrude from the top of a harness or collar as shown in FIGS. 1 and 2. However, the light-emitting device may be positioned on top of, around, or on or within any other location of the indicator apparatus 100 to allow the indicator apparatus 100, and therefore the animal, to be clearly visible to nearby people. Thus, for example, a plurality of high intensity light-emitting diodes may be arranged around the indicator apparatus 100 such that the indicator apparatus 100 is visible from all directions. Similarly, one or more of the light-emitting diodes or other lights may be directed outward and away from the indicator apparatus 100 to draw desired attention to the animal. In various configurations, the indicator 104 may be located in a housing discrete from the housing 116. For example, the housing 116 may contain the processor 106, location determining component 102, the processor 106, the memory 108, the communications elements, and other related hardware while the indicator 104 is positioned in a second housing in electrical communication (wired or wireless) with the housing 116. Such a configuration enables the housing 116 to be placed on the top of the dog collar while the indicator 104 is positioned on the bottom of the dog collar, or vice versa. Similarly, the housing 116 may be configured as a vest, as described below, while the indicator 104 is positioned on a neck-worn collar.

The processor 106 is coupled with the location determining component 102, the indicator 104, the memory 108, the stimulation element 109, the communications elements 110, 112, and other indicator apparatus 100 elements through wired or wireless connections, such as a data bus, to enable information to be exchanged between the various elements. Further, the processor 106 may be operable to control functions of the indicator apparatus 100 according to a computer program, including one or more code segments, or other instructions associated with the memory 108 or with various processor logic and structure. The processor 106 may comprise various computing elements, such as integrated circuits, microcontrollers, microprocessors, programmable logic devices, etc, alone or in combination, to perform the operations described herein.

As explained in more detail below with reference to the flow diagram, the processor 106 may monitor the current location of the indicator apparatus 100 and trigger the indicator 104 when the apparatus approaches a boundary. The processor 106 may determine a current geographic location of the indicator apparatus 100 by receiving geographic location information from the location determining component 102. Alternatively, the processor 106 may independently determine geographic locations based on information and/or data, such as received navigation signals, provided by the location determining component 102, stored within the memory 108, or acquired from other devices or elements. The processor 106 may also receive location information from another device through the communications elements 110 or 112.

The memory 108 is directly or indirectly coupled with the processor 106 and is operable to store various data utilized by the processor 106 and/or other elements of the indicator apparatus 100. The memory 108 may include removable and non-removable memory elements such as RAM, ROM, flash, magnetic, optical, USB memory devices, combinations thereof, and/or other conventional memory elements. The memory 108 may also be integral with the processor 106, such as in embodiments where the memory 108 comprises internal cache memory.

The memory 108 may store cartographic data such as coordinates and/or other location information for one or more boundaries. The boundaries may be any locations or areas where it may be desirable to draw attention to the presence of an animal wearing the indicator apparatus 100. The boundaries may be, for example, roads, parking lots, pedestrian paths (trails, sidewalks, walkways, etc.), driveways, or other areas where cars and other vehicles frequently travel. The boundaries may correspond to cartographic data categories associated with the stored cartographic data such that it is not necessary for the memory 108 to include a separate and independent database of boundaries. That is, the boundaries may simply correspond to categories of cartographic features stored within the memory 108, such as all roads. Such functionality eliminates the need to create a specific database of boundaries as the boundaries may be automatically identified by the indicator apparatus 100 using readily-available cartographic data. The boundaries may also include parks, playgrounds, yards, and other areas where it may be desirable to draw attention to the presence of animals.

In some configurations, the boundaries may include land ownership boundaries, such as boundary information for public and private land and boundary information for private land with different owners. Such boundary information enables various functionality to be provided, as discussed below, as the animal crosses into public land or private land.

In some configurations, the boundaries may be determined based on user input or user preferences. For example, the person P or other user may enter geographic coordinates for the boundaries into the navigation unit 200 or another computer and then transfer the information to the memory 108 of the indicator apparatus 100 via the primary or secondary communications elements 110, 112. Alternatively, the person P or other user may select the boundaries from a map displayed by the navigation unit 200 and/or another computer and then transfer them to the indicator apparatus 100 via the primary or secondary communications elements. Location information for boundaries may also be transmitted to the indicator apparatus 100 from other similar indicator devices or from the navigation units that communicate with the other indicator devices.

Additionally or alternatively, the boundaries may be automatically identified by the indicator apparatus 100 and/or navigation unit 200. For example, based on user preferences or default settings, the indicator apparatus 100 may automatically identify boundaries corresponding to any roads or other selected cartographic categories. That is, the user may simply identify, via the indicator apparatus 100, navigation unit 200, or other interfacing device such as a web site, what cartographic categories should trigger illumination of the indicator apparatus 100. Such functionality eliminates the need for the user to manually designate all boundaries while ensuring that the animal will be highly visible to motorists when traversing roads or other identified cartographic features. In some configurations, the cartographic categories may include road classifications. For example, the road classifications may indicate the size, expected speed, width, and/or other characteristics of roads represented by the cartographic data. Thus, the road classifications may indicate if a given road is a highway, a two-lane road, a paved road, an unpaved road, etc.

Location information for boundaries may also be stored in memory remote from the indicator apparatus, such as in the memory 208 of the navigation unit 200. In this case, comparisons to the boundaries are also performed remotely as described below.

The memory 108 may also store a computer program, code segments, or other data for instructing the processor 106 and other indicator apparatus 100 elements to perform the steps described below. Further, the memory 108 may store various data recorded, detected, or otherwise generated by the indicator apparatus 100, such as current and previous geographic locations of the indicator apparatus 100, operational characteristics of the indicator apparatus 100, etc. Further, the various data stored within the memory 108 may be associated within a database to facilitate retrieval of information by the processor 106.

The primary communications element 110 is coupled with the processor 106 and is operable to transmit information and/or data from the indicator apparatus 100 to the navigation unit 200 or other external devices. The primary communications element 110 may be operable to transmit data and information over substantial distances, such as a distance greater than a half mile, utilizing radio frequency signals. In one embodiment, the primary communications element 110 includes a VHF transmitter operable to transmit data and information on various VHF bands. Use of a VHF transmitter enables the indicator apparatus 100 to efficiently transmit information with limited interference over long distances. However, the primary communications element 110 may utilize any radio or non-radio methods to communicate with external devices. For instance, in some configurations, the primary communications element 110 may employ cellular communication technology.

The primary communications element 110 may include an antenna 122 to facilitate transmission of data and information from the indicator apparatus 100. In embodiments employing a VHF transmitter, the antenna 122 may include a VHF helical whip antenna to maximize the broadcast range of the primary communications element 110. However, the antenna 122 may include any antenna elements and is not limited to utilization of a VHF helical whip antenna.

As shown in FIGS. 1 and 2, the antenna 122 may protrude from the housing to enable the antenna 122 to transmit data and information over significant distances. The antenna 122 may be removably coupled with the housing 116 and other indicator apparatus 100 elements to enable the antenna 122 to be easily replaced should it become damaged during use and to further enable the indicator apparatus 100 to be compactly transported when not in use. However, in some embodiments the antenna 122 may be permanently coupled with the housing 116 to reduce the complexity of the indicator apparatus 100. In some embodiments, the antenna 122 may also be enclosed entirely within the housing 116.

The primary communications element 110 may only transmit data and information from the indicator apparatus 100 or may be operable to both transmit and receive information to and from external devices or otherwise engage in bi-directional communication. For instance, the primary communications element 110 may be operable to transmit data and to receive data from the portable navigation unit 200 or other external device and store the received data within the memory 108 for use by the processor 106.

The secondary communications element 112 is also coupled with the processor 106 and is operable to communicate with the portable navigation unit 200 or other external devices independent of the primary communications element 110. The secondary communications element 112 may use WiFi (802.11), Bluetooth, ultra-wideband (UWB), Wi-Max, Wireless USB, ZigBee, and/or other conventional wireless data transfer protocols to efficiently transfer data between the indicator apparatus 100 and the navigation unit 200. Thus, in embodiments where the primary communications element 110 employs VHF or other radio frequency signals that are efficient for long-range communication but inefficient or ineffective for rapid data transfer, the secondary communications element 112 enables the indicator apparatus 100 and navigation unit 200 to rapidly exchange data to facilitate operation of the present invention. For instance, the secondary communications element 112 may receive data and information from the navigation unit 200 and store the received data and information within the memory 108 for use by the processor 106. The secondary communications element 112 may also receive location data for boundaries and other data and information from the navigation unit 200 for configuration purposes.

The power source 114 provides electrical power to components of the indicator apparatus 100. The power source 114 may comprise conventional power supply elements, such as batteries, battery packs, fuel cells, solar cells and solar power elements, etc. The power source 114 may also comprise power conduits, connectors, and receptacles operable to receive batteries, battery connectors, or power cables. For example, the power source 114 may include both a battery to enable portable operation and a power input for receiving power from an external source such as an electrical outlet.

The housing 116 houses and encloses at least portions of the processor 106, the location determining component 102, the memory 108, the indicator 104, the power source 114, and the communications elements 110, 112. The housing 116 may be substantially waterproof and formed of durable and rigid materials to enable the indicator apparatus 100 to be utilized in potentially inclement conditions, such as those encountered outdoors while hunting. In some configurations, as discussed above, the indicator 104 may be positioned in a second housing discrete from the housing 116.

As shown in FIG. 1, the housing 116 may be configured for coupling with a body harness 124 or other belt-like apparatus that is operable to be secured around the animal's mid-section. Alternatively, as shown in FIG. 2, the housing 116 may be configured for coupling with a dog collar 126 to facilitate securement of the indicator apparatus around the animal's neck. As shown in FIGS. 1 and 2, the configuration of the housing 116, the antenna 122, the body harness 124, and the collar 126 ensures that the antenna 122 is oriented properly, i.e. upwards, regardless of the general position of the animal to which the housing 116 is coupled. The configuration of the housing and indicator 104 also ensures that the indicator 104 is visible from all directions regardless of the position or posture of the animal A. Similarly, in configurations where the indicator apparatus 100 lack tracking or communications functionality, the housing 116 may take the form of a conventional dog collar.

In some configurations, the indicator apparatus 100 may be equipped with a user interface 107 to allow users to interface with the apparatus 100 without using a second device such as the navigation device 200. For example, the user interface 107 may enable the person P or other users, third parties, or other devices to enter location information for boundaries, boundary preferences, boundary categories, and the like. For example, the user interface 107 may allow the user to enter boundary coordinates such as latitude or longitude or boundary preferences such as the categories of cartographic features that may be used by the apparatus 100 to automatically determine boundaries. The user interface 107 may comprise one or more functionable inputs such as buttons, switches, scroll wheels, etc, a touch screen display, lights such as LED elements voice recognition elements such as a microphone, pointing devices such as mice, touchpads, trackballs, styluses, a camera such as a digital still or video camera, combinations thereof, etc. In one configuration, the user may depress one or more buttons associated with the user interface 107 to select a desired cartographic category for boundary formation and receive a selection confirmation from one or more displays, lights, or speakers associated with the user interface 107. A display associated with the user interface 107 may additionally or alternatively provide other device information, such as status, battery level, boundary settings, current and previous apparatus location, combinations thereof, and the like.

The stimulation element 109 may provide stimulation to the animal A to encourage a desired result. For example, the animal may be trained to recognize stimulation(s) applied by the stimulation element 109 and to perform a desired action in response to the stimulation(s). In various configurations, the stimulation element 109 may be operable to provide varying levels of electrical stimulation to the animal A. In addition to, or as an alternative to electrical stimulation, the stimulation element 109 may be operable to provide acoustic (tonal), olfactory (scents such as citronella), optical, vibratory, or other forms of stimulation. For instance, the stimulation element 109 may include a speaker, lights, a vibratory element, and/or other training aids in order to provide any desired form of stimulation to the animal. The stimulation element 109 may be embedded in the harness 124 and/or the collar 126.

Embodiments of the portable navigation unit 200 will now be described with reference to FIGS. 3 and 4. The navigation unit 200 may be any portable electronic device that is operable to communicate with the indicator apparatus 100 and display information. An embodiment of the navigation unit 200 may include a location determining component 202 operable to determine a current geographic location of the unit; a sensor 204 operable to sense a condition of the navigation unit 200; a processor 206; memory 208 coupled with the processor 206 and operable to store information; a user interface 210; a primary communications element 212 and a secondary communications element 214 operable to communicate with the indicator apparatus 100; a power source 216 for powering various unit 200 elements; a display 218 for displaying information generated by the processor 206, and a housing 220 for housing various navigation unit 200 elements.

The location determining component 202, processor 206, and memory 208 are generally similar or identical to the location determining component 102, processor 106, and memory 108 of the indicator apparatus 100 discussed above and are therefore not described in detail again. However, in some embodiments the location determining component 202 and memory 208 may include additional capabilities, such as additional processing power, greater memory capacity, reduced component access time, or GPS precision, beyond those provided by the components of the indicator apparatus 100 due to the additional navigation features provided by the navigation unit 200 discussed below. For instance, the memory 208 may comprise multiple memory elements, such as internal RAM, internal flash memory, and removable flash memory elements.

The sensor 204 may include a tilt compensated three-axis magnetic compass operable to determine the heading or general orientation of the navigation unit 200. Determining the orientation or heading of the navigation unit 200 facilitates tracking of the indicator apparatus 100 by providing the user with an accurate bearing to the indicator apparatus 100. In some embodiments the sensor 204 may additionally include a MEMS-based pressure sensor to sense ambient conditions around the navigation unit 200 or to determine altitude, weather trends, etc.

The user interface 210 enables the person P or other users, third parties, or other devices to enter location information for boundaries to be uploaded to the indicator apparatus or otherwise share information with the navigation unit 200. The user interface 210 may comprise one or more functionable inputs such as buttons, switches, scroll wheels, etc, a touch screen associated with the display 218, voice recognition elements such as a microphone, pointing devices such as mice, touchpads, trackballs, styluses, a camera such as a digital still or video camera, combinations thereof, etc. Further, the user interface 210 may comprise wired or wireless data transfer elements such as removable memory including the memory 208, data transceivers, etc, to enable the user and other devices or parties to remotely interface with the navigation unit 200.

The user interface 210 may provide various information to the user utilizing the display 218 or other visual or audio elements such as a speaker. Thus, the user interface 210 enables the user and navigation unit 200 to exchange information, including tracking information, geographic entities, navigation unit and tracking apparatus configuration, security information, preferences, route information, points of interests, alerts and alert notification, navigation information, waypoints, a destination address, etc.

The primary communications element 212 enables the navigation unit 200 to receive information and/or data transmitted by the indicator apparatus 100 or another device. The primary communications element 212 may be any device or combination of devices operable to receive a signal, such as a receiver coupled with an antenna. The primary communications element 212 may be operable to only receive signals transmitted by other devices, such as the indicator apparatus 100, or may be operable to both receive and transmit signals.

The primary communications element 212 is compatible with the primary communications element 110 to enable the navigation unit 200 to easily receive data and information from the indicator apparatus 100. For example, in embodiments where the primary communications element 110 includes a VHF transmitter, the primary communications element 212 may include a corresponding VHF receiver. However, in some embodiments, the primary communications element 212 may include a multi-band receiver and/or scanner operable to identify and receive signals transmitted on multiple frequencies or bands.

Figure 3:
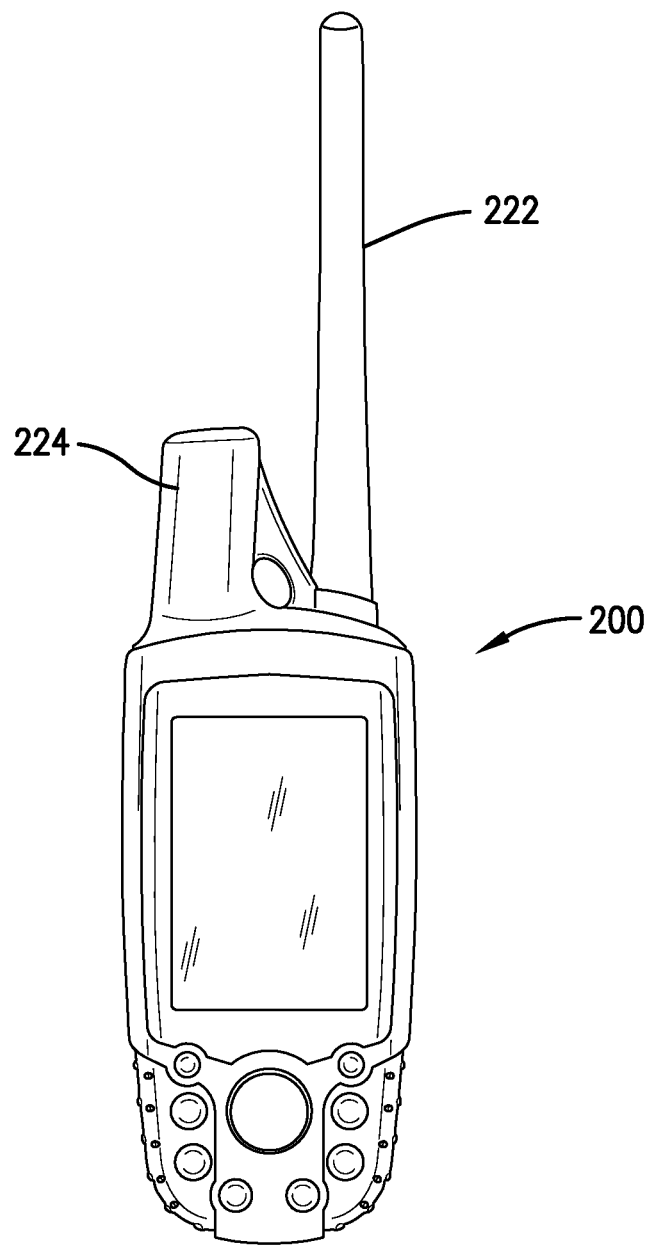
FIG. 3 is a front view of a portable navigation unit configured in accordance with various embodiments of the invention.
Figure 4:
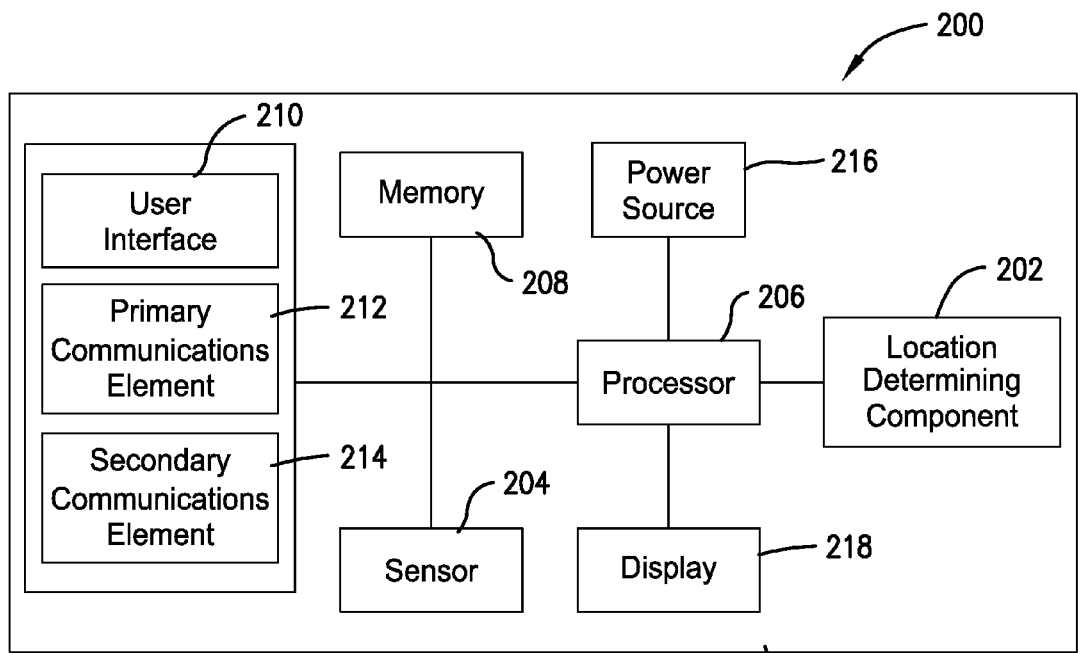
FIG. 4 is a block diagram showing some of the components of the navigation unit of FIG. 3.

The primary communications element 212 may include an antenna 222 as shown in FIG. 3 to facilitate reception of signals transmitted by the indicator apparatus 100. In embodiments where the communications element 212 comprises a VHF receiver, the antenna 222 may comprise a VHF helical whip antenna. The antenna 222 may be permanently or removably coupled with the housing 220 or be entirely enclosed therein.

The antenna 222 may be integral or discrete with an antenna utilized by the location determining component 202. For instance, as shown in FIG. 3, the navigation unit 200 may include both the antenna 222 to receive signals from the indicator apparatus 100 and a GPS antenna 224 to receive GPS satellite signals for use by the location determining component 202 and/or processor 206.

The secondary communications element 214 is generally similar to the secondary communications element 112 of the indicator apparatus 100 and is operable to communicate with the indicator apparatus 100 or other external device independent of the primary communications element 212. The secondary communications element 214 is operable to transmit and receive information to and from the indicator apparatus 100 independent of the primary communications element 212. The secondary communications element 214 may be operable to utilize WiFi (802.11), Bluetooth, ultra-wideband (UWB), Wi-Max, Wireless USB, ZigBee, IRDA, and/or other conventional wireless data transfer protocols to efficiently transfer data between the indicator apparatus 100 and the navigation unit 200.

The power source 216 provides electrical power to various navigation unit 200 elements and may comprise conventional power supply elements, such as batteries, battery packs, fuel cells, solar cells and solar elements, etc. The power source 216 may also comprise power conduits, connectors, and receptacles operable to receive batteries, battery connectors, or power cables. For example, the power source 216 may include both a battery to enable portable operation and a power input for receiving power from an external source such an automobile.

The display 218 is coupled with the processor 206 and/or other navigation unit 200 elements and is operable to display various information corresponding to the navigation unit 200, such as tracking information, maps, locations, and other information as is described below. The display 218 may be monochrome or color and comprise display elements including, but limited to, CRT and LCD devices. As described above, the display 218 may include a touch-screen display to enable the user to interact with the display 218 by touching or pointing at display areas to provide information to the navigation unit 200.

The housing 220 may be handheld or otherwise portable to facilitate transport of the navigation unit 200 between locations. The housing 220 may be comprised of generally conventional, substantially waterproof, and durable materials, such as ABS, other plastics, metals, etc, to protect the enclosed and associated elements when the navigation unit 200 is utilized in potentially inclement conditions such as those encountered while hunting.

Embodiments of the present invention may also comprise one or more computer programs stored in the memory 108 or 208 or other computer-readable medium residing on or accessible by the indicator apparatus 100 or navigation unit 200. The computer programs may comprise listings of executable instructions for implementing logical functions and can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be the memory 108 or 208 or any other non-transitory means that can contain, store, or communicate the programs. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 8:
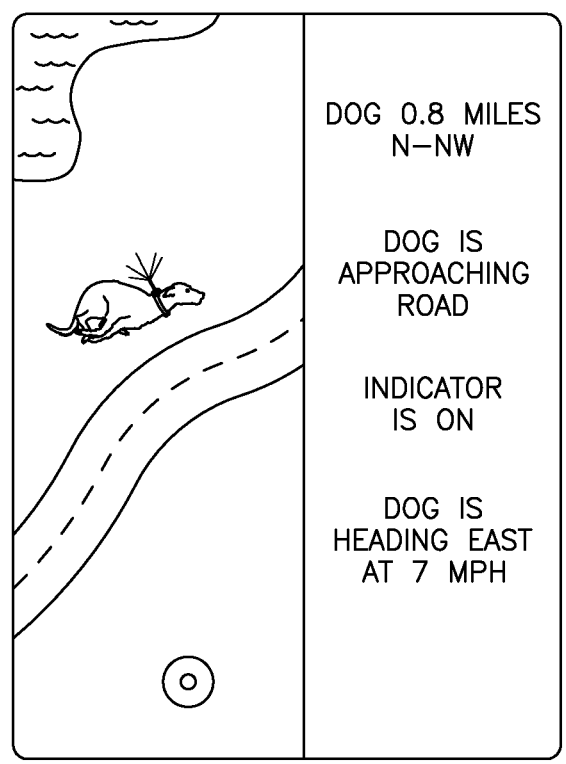
FIG. 8 is a sample screen display of the navigation unit showing a representation of the location of a tracked animal and a status of the indicator.

Certain operational aspects of the above-described indicator apparatus 100 and navigation unit 200 will now be described with reference to the screen display of FIG. 8 and the flow chart of FIG. 9. Some of the blocks of the flow chart may represent a step or steps in a method or a module segment or portion of code of computer programs of the present invention. In some alternative implementations, the functions noted in the various blocks may occur out of the order depicted in the flow chart. For example, two blocks shown in succession in FIG. 9 may in fact be executed substantially concurrently, or the blocks may sometimes be executed in the reverse order depending upon the functionality involved.

Figure 9:
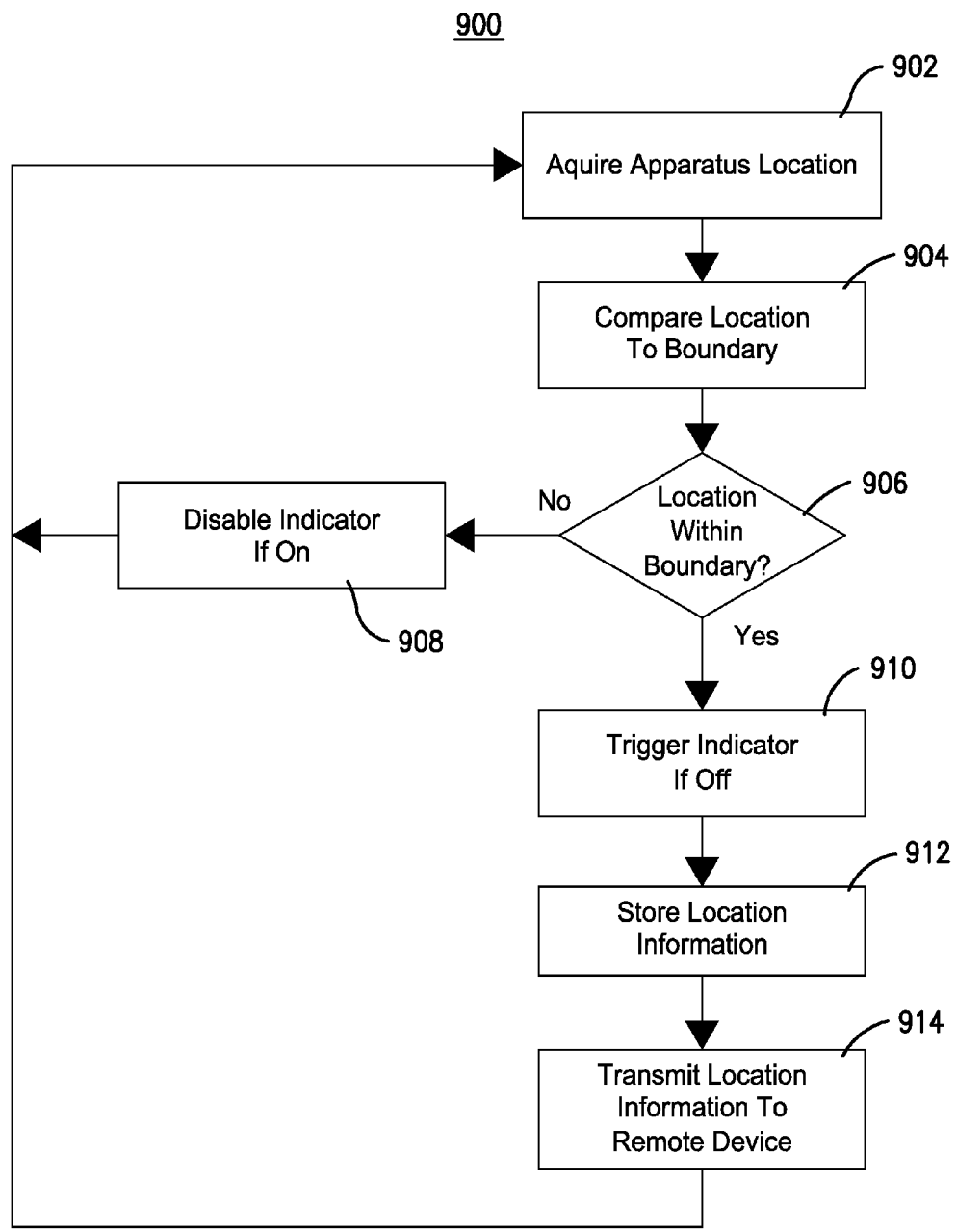
FIG. 9 a flow chart showing steps that may be performed by or with the indicator apparatus.

FIG. 9 depicts a method 900 and/or portions of a computer program in which the indicator apparatus 100 determines the locations of an animal such as the illustrated dog A and alerts nearby persons when the animal approaches a boundary. More specifically, in one embodiment, the processor 106 compares the current location of the apparatus 100 to the locations of boundaries stored in the memory 108 or elsewhere and triggers the light emitting device or other indicator 104 whenever the animal indicator apparatus 100 approaches a boundary to alert motorists and/or other nearby persons of the presence of the animal. The boundary locations may correspond to classes of cartographic features, such as all roads, to enable the apparatus 100 to automatically determine the locations of boundaries.

The current geographic location of the indicator apparatus 100, and thus the animal A to which the indicator apparatus 100 is mounted, is acquired as shown in step 902. The current geographic location of the indicator apparatus 100 may be acquired and determined using the location determining component 102. Thus, for instance, the current geographic location may be determined in step 902 by receiving GPS signals and computing the current geographic location from the received GPS signals. The geographic locations of the apparatus 100 may alternatively be acquired and determined utilizing other methods, such as by retrieving the current geographic location from the memory 108 or from one or both of the communications elements 110, 112. Similarly, the processor 106 may calculate the current geographic location of the indicator apparatus 100 utilizing information and data stored within the memory 108.

Although only shown in one step of FIG. 9, the current location of the indicator apparatus 100 may be continuously or periodically acquired to provide an accurate and updated representation of the location of the indicator apparatus 100. In some embodiments, the current geographic location of the apparatus may be acquired at a user-defined or pre-defined interval, such as every thirty seconds, every minute, etc, to conserve the power source 114 and lengthen the time in which the indicator apparatus 100 may be utilized for tracking. In some configurations, the update interval may be dynamic and vary depending on the proximity of the indicator apparatus 100 to one or more of the boundaries. For example, if the apparatus 100 is miles from any boundary, the update interval may be greatly reduced.

In some configurations, the indicator apparatus 100 may be adapted for general tracking purposes—e.g., enabling the location of the animal to be generally tracked by the navigation unit 200 or other devices. In such configurations, data content transmitted by the indicator apparatus 100 may vary or change depending on the location of the indicator apparatus 100 in relation to the boundaries. For example, as the indicator apparatus 100 approaches a boundary, information in addition to location may be transmitted to the navigation unit 200 and/or other devices to allow the user to better ascertain the behavior of the animal. Similarly, when the indicator apparatus 100 is far from a boundary, less information may be transmitted to conserve resources.

The geographic location of the indicator apparatus 100 is then compared to the boundaries in step 904. When location information for the boundaries is stored in the memory 108 of the indicator apparatus 100, the processor 106 accesses the memory 108 and compares the current geographic location of the indicator apparatus 100 to the boundaries. When location information for the boundaries is stored remotely, such as in the memory 208 of the navigation unit 200, the processor 106 transmits location information for the current geographic location of the indicator apparatus to the remote device for comparison. As described below, some embodiments of the invention compare the current geographic location of the apparatus 100 to specific and precise locations of boundaries, whereas other embodiments compare the location to areas near boundaries.

As discussed above, the boundary locations may correspond to classes of cartographic features, such as all roads or selected road classifications, to enable the apparatus 100 to automatically determine the locations of boundaries. Thus, the location information for the boundaries may correspond to location information for cartographic features stored within the memory 108, such as location information for roads. Thus, the current geographic location of the apparatus 100 may be compared with the current geographic location of certain cartographic features (e.g., boundaries) in step 904.

Step 906 then determines if the most recent geographic location of the indicator apparatus 100 is near any of the boundaries in step 906. "Near," as used herein, may include locations that are on the boundaries, within the boundaries, or within close physical proximity to the boundaries such that the indicator 104 may be seen by a person located on or within the boundaries. In some embodiments, the processor 106 determines if the most recent geographic location of the indicator apparatus has crossed or is actually within one of the boundaries. In other embodiments, the processor 106 may determine if the most recent geographic location of the indicator apparatus is within a prescribed distance, such as 5 feet, 10 feet, 100 feet, etc., of one of the boundaries.

As mentioned above, these comparisons may also be performed remotely from the indicator apparatus such as by the processor 206. In such cases, the remote device that performs the comparison may enable or disable the indicator 104 via signals sent to the primary or secondary communication elements 110, 112.

If step 906 determines that the most recent geographic location of the indicator apparatus is not within or near any of the boundaries, step 908 disables the indicator if it is currently activated. The method then returns to step 902 to acquire new location information for the most recent location of the indicator apparatus.

However, if step 906 determines that the most recent geographic location of the indicator apparatus is within or near any of the boundaries, step 910 triggers the indicator, or keeps it energized if it is already activated. In some embodiments, the processor 108 simply activates the indicator 104 if the indicator apparatus 100 reaches or crosses a boundary. In other embodiments, the processor 106 may activate the indicator 104 when the indicator apparatus is near the boundary, such as 100 feet, of a boundary. In still other embodiments, the processor may increase the intensity or frequency of the light-emitting device and/or change or alternate the color of the light-emitting device as the current geographic location of the apparatus approaches the location of the boundary to draw attention to the animal. The apparatus 100 may utilize user-defined parameters, such as a boundary distance, to determine the point at which the indicator 104 is activated when approaching a boundary and the behavior of the indicator 104 as it nears the boundary.

For example, in one embodiment, the processor 106 may activate the light emitting device or other indicator 104 at a low intensity level when the indicator apparatus 100 is within a first distance from the boundary, at a medium intensity level when the indicator apparatus is within a second distance from the boundary, and at a high intensity level when the indicator apparatus is within a third distance from the boundary. In one embodiment, the first, second, and third distances are about 100 feet, 50 feet, and 20 feet, respectively, and the low, medium, and high intensity levels are about 33%, 66%, and 100% of the rated capacity of the indicator, respectively. Different distances and intensity levels may be used without departing from the scope of the invention. Furthermore, the distances and intensity values may be set and/or changed by a user of the navigation unit 200.

In another embodiment, the processor 106 may activate the light emitting device in a steady state (not blinking) when the indicator apparatus is within a first distance from the boundary, at a first duty cycle or blinking rate when the indicator apparatus is within a second distance from the boundary, and at a second duty cycle or blinking rate when the indicator apparatus is within a third distance from the boundary. In this embodiment, the first, second, and third distances may also be about 100 feet, 50 feet, and 20 feet, respectively, and the first and second duty cycles may be about 66% and 33%, respectively. Again, the distances and duty cycles may be user configured and may be changed.

In yet another embodiment, the processor 106 may activate the light emitting device with a first color such as green when the indicator apparatus 100 is within a first distance from the boundary, with a second color such as yellow when the indicator apparatus is within a second distance from the boundary, and with a third color such as red when the indicator apparatus is within a third distance from the boundary. Again, the first, second, and third distances may be about 100 feet, 50 feet, and 20 feet, respectively and may be changed.

In some configurations, the indicator 104 may be turned off as the indicator apparatus 100 approaches a boundary and be activated when the apparatus 100 is away from the boundaries. Such reverse functionality may be useful for police animals, or other service animals, to be less conspicuous when tracking fugitives or entering sensitive areas.

The processor 106 may also simultaneously vary the intensity, frequency, and/or color of the light emitting device as a function of the distance from the boundary. For example, the processor 106 may activate the light emitting device at a low intensity level, in a first color, and at a first duty cycle when the indicator apparatus is within a first distance from the boundary, at a medium intensity level, in a second color, and at a second duty cycle when the indicator apparatus is within a second distance from the boundary, and at a high intensity level, in a third color, and at a third duty cycle when the indicator apparatus is within a third distance from the boundary. Likewise, the processor may decrease the intensity or frequency of the light-emitting device and/or change or alternate the color of the light-emitting device as the current geographic location of the apparatus gets further from the location of the boundary to gradually stop drawing attention to the animal.

In some configurations, the distance from the boundary at which the light emitting device is activated may vary and/or depend on GPS accuracy. For example, if the location determining component 102 indicates that GPS accuracy (position error) is 100 feet, the distance at which the light emitting device may be extended to account for the possible 100 feet position error to ensure that the indicator apparatus 100 is illuminated as the animal cross the boundary. Thus, in the above example, the indicator apparatus 100 may be illuminated at 120 feet from the boundary, instead of a default 20 foot distance, due to reduced GPS accuracy. Similarly, the distance may be decreased as GPS accuracy improves.

In some embodiments, the processor 106 may also trigger the stimulation element 109 when the animal A approaches or crosses a boundary. The processor may also increase an intensity of the stimulation element 109 as the animal gets closer to the boundary and deactivate the stimulation element entirely if the animal heads away from the boundary. Thus, the indicator apparatus 100, and/or the navigation unit 200, may automatically issue a recall command, via application of the stimulation element 109, to cause the animal to return and move away from the boundary. In some configurations, instead of automatically applying stimulation, the indicator apparatus 100 may transmit an alert to the navigation unit 200, and/or the navigation unit 20 may automatically generate such an alert, to notify the user that the animal is approaching a boundary and provide an opportunity for the user to initiate a recall command before the animal reaches the boundary.

Information relating to the location of the indicator apparatus 100 when the indicator 104 is energized may also be stored within the memory 108 or other memory as depicted in step 912. In some embodiments, location information for each time the indicator is activated is stored as a waypoint in memory.

As the animal wearing the indicator apparatus 100 crosses multiple boundaries, a database or other organized listing of geographic locations at which the indicator 104 was activated may be formed or otherwise stored within the memory 108 or other memory. By storing information for a plurality of locations within the memory 108, the user P or other person may later analyze the stored data for tracking or training purposes. In embodiments where the memory 108 is removable, the user may remove the memory 108 and couple the memory 108 with a computing element or the navigation unit 200 to further analyze the stored information. For example, a user may analyze the information to determine locations where a dog frequently crossed a road so that the user may avoid taking the dog to the same area in the future. Or, the user may attempt to train the dog to avoid the road or other boundary in the future.

In step 914, information relating to the locations of the indicator apparatus 100 when the indicator is triggered may be transmitted to the navigation unit 200 or another external device. In some embodiments, the primary communications element 110 is used to transmit the information so that the information may be received from significant ranges, such as those greater than a half mile. In other embodiments, it may be desirable to transmit the information with the secondary communications element 112, such as where the navigation unit 200 and indicator apparatus 100 are in close proximity and rapid transfer of information is desirable.

The information may be transmitted as soon as it is stored or only at user-defined or pre-defined intervals, such as every 5 seconds, 10 seconds, 15 seconds, 30 seconds, 1 minute, 5 minutes, etc, to conserve the power source 114. The information may also be transmitted only upon user prompt. The information may be transmitted simultaneously or in rapid sequence. Thus, for instance, every sixty seconds the primary communications element 212 may transmit all information for sensed animal conditions and corresponding geographic locations that were stored within the memory 108 within the previous sixty seconds. Such a configuration reduces power consumption while still allowing the navigation unit 200 or other remote device to receive comprehensive information regarding the indicator apparatus 100.

Even when the indicator 104 is not triggered step 914 may still transmit information for the current geographic location of the apparatus 100. This enables tracking of the animal independent of the sensing of animal conditions.

After the indicator 104 is triggered in step 910, the method returns to step 902 to acquire location information for the most recent location of the indicator apparatus. If the animal remains in or near the boundary, the indicator 104 may remain activated as described above. However, if the animal leaves the boundary or moves away from it, the indicator may be turned off or changes states as described above.

The navigation unit 200 may store the received location information within its memory 208. All information and data received from the indicator apparatus 100 may be stored within the memory 208 in an ordered listing or database to enable subsequent analysis. However to reduce required memory capacity, in some embodiments, only portions of the received information are stored within the memory 208, such as the locations and conditions received within the last two hours, or any other interval.

The memory 208 of the navigation unit 200 may also store cartographic information such as maps, terrain and elevation information, points of interest, street and thoroughfare information, navigation information, or any other information corresponding to various locations. The processor 206 is operable to access the memory 208 and cartographic information according to the current geographic location of the indicator apparatus 100.

For instance, the processor 206 may consider the received current geographic locations of the indicator apparatus 100, access a database of cartographic information stored within the memory 208, and retrieve cartographic information corresponding to the indicator apparatus 100 location. Such cartographic information may include a map of the area surrounding the current indicator apparatus 100 location. Similarly, the processor 206 may access cartographic information corresponding to previously acquired geographic locations or predicted future locations of the indicator apparatus 100.

The navigation unit 200 may also generate and display a representation of the indicator apparatus location 100 each time the indicator 104 is triggered. The processor 206 may generate such representations on a map to enable the user to easily identify the location of the animal and indicator apparatus 100 when the animal approaches a boundary. The location information may be represented with a graphical indication or an audible indication, such as voice information relating to the acquired information. For example, a graphic of a running dog may be displayed at the location where the animal approaches a boundary as shown in FIG. 8. The representation may also indicate the location of the animal and the presence of the boundary in text as shown in FIG. 9.

The processor 206 may also present the location information at which boundaries are reached in list or table form to enable a user to quickly view a number of locations. The information may also be grouped such that location information for the same boundaries is displayed together.

The navigation unit 200 may access cartographic information each time information is received from the indicator apparatus 100. Such a configuration ensures that the processor 206 generates accurate representations of the area in proximity to the indicator apparatus 100. However, to conserve navigation unit 200 resources, in some embodiments cartographic information may be accessed only a certain intervals, such as every 15 seconds, 30 seconds, etc. In some embodiments, the navigation unit 200 may access cartographic information stored on other devices. For example, the secondary communications element 214 may access the Internet or other external devices to retrieve cartographic information corresponding to the acquired indicator apparatus 100 location.

The navigation unit 200 may also display a representation of the current location of the indicator apparatus 100 that is independent of the current location of the navigation unit 200 such that the absolute position of the indicator apparatus 100 is provided. "Absolute position" as utilized herein refers to a position or location that is not dependent on the location of the navigation unit 200, such as a particular latitude or longitude or a position of the indicator apparatus 100 on a map as shown in FIG. 8. Use of absolute positions to represent the location of the indicator apparatus 100, in contrast to purely relational representations based on the current location of the navigation unit 200, enables the user to quickly and easily identify the location of the animal utilizing cartographic information, such as landmarks, street intersections, etc, instead of purely relational information which may be of limited value to the user independent of cartographic information.

As discussed above, the cartographic information may additionally or alternatively include terrain and elevation information. Consequently, the processor 206 may generate a representation of the indicator apparatus 100 and animal showing the animal on grass, near water, at a certain elevation, on a path, on a road, etc. Such terrain and elevation information further assists the user in tracking the animal by providing the user additional information regarding the animal's current location. As should be appreciated, any cartographic information accessed by the navigation unit 200 may be utilized to generate and display the representation of the current geographic location of the indicator apparatus 100.

The generated and displayed information may also include a representation of the current geographic location of the navigation unit 200. For instance, as shown in FIG. 8, the current geographic location of the navigation unit 200 may be displayed as two concentric circles. By representing absolute unit and apparatus locations utilizing cartographic information, the user P may easily identify his or her own location, the location of the animal A, and the best route from the current navigation unit location to the current indicator apparatus location. Further, in some embodiments the processor 206 may generate a route to the current indicator apparatus 100 location using the accessed cartographic information.

The generated and displayed representations may also include relational information regarding the current and previous locations of the indicator apparatus 100 and navigation unit 200. For instance, the generated and displayed representations may include information such as the bearing, direction, and/or distance to the indicator apparatus 100 from the navigation unit 200. Use of both relational and absolute location information enables the user to efficiently track the animal based on cartographic or directional information.

In some embodiments, the generated and displayed representations may also include supplemental tracking information formed utilizing a plurality of received indicator apparatus 100 locations. For instance, the supplemental tracking information may include the speed and acceleration of the indicator apparatus 100, a plot or display of previous indicator apparatus 100 locations, a projected future path or route of the indicator apparatus 100 and/or animal, the direction, bearing, or heading of the indicator apparatus 100, etc.

Although the technology has been described with reference to the embodiments illustrated in the attached drawing figures, it is noted that equivalents may be employed and substitutions made herein without departing from the scope of the technology as recited in the claims.

The invention claimed is:

1. An animal indicator apparatus operable to be worn by an animal, the apparatus comprising:
    a location determining component operable to determine a current geographic location of the apparatus;
    a memory operable to store cartographic data including data representative of a location of at least one boundary;
    an indicator including a light-emitting device; and
    a processor coupled with the location determining component, the memory, and the indicator, the processor operable to activate the indicator when the current geographic location of the apparatus is near the location of a boundary;
    wherein the processor varies an intensity or blinking rate of the light-emitting device as a function of a distance between the current geographic location of the apparatus and the location of the boundary.

2. The apparatus of claim 1, wherein the boundary is a road, parking lot, or pedestrian path.

3. The apparatus of claim 1, wherein the light emitting device does not blink at a first distance between the current geographic location of the apparatus and the location of the boundary and blinks at a second distance between the current geographic location of the apparatus and the location of the boundary, the second distance being lesser than the first distance.

4. The apparatus of claim 3, wherein the processor increases the intensity or blinking rate of the light-emitting device as the current geographic location of the apparatus approaches the location of the boundary and decreases the intensity or blinking rate of the light-emitting device as the current geographic location of the apparatus gets further from the location of the boundary.

5. The apparatus of claim 4, wherein the processor increases both the intensity and the blinking rate of the light-emitting device as the current geographic location of the apparatus approaches the boundary.

6. The apparatus of claim 1, further comprising a communications component coupled with the processor and operable to transmit location information corresponding to the current geographic location of the apparatus when the current geographic location of the apparatus approaches the location of the boundary.

7. The apparatus of claim 1, wherein the location determining component comprises a Global Positioning System (GPS) receiver and utilizes received GPS signals to determine the current geographic location of the apparatus.

8. The apparatus of claim 1, further comprising;
    a housing to house at least portions of the location determining component, the indicator, the memory, and the processor; and
    a collar operable to couple with the housing and be secured around the animal's neck.

9. The apparatus of claim 1, wherein the cartographic data includes cartographic features corresponding to a plurality of cartographic categories and the at least one boundary corresponds to cartographic features of one or more of the cartographic categories.

10. The apparatus of claim 1, wherein the data representative of a location of at least one boundary is geographic coordinates.

11. The apparatus of claim 1, wherein the boundary separates public land and private land.

12. The apparatus of claim 1, wherein the data representative of a location of at least one boundary is user-defined.

13. The apparatus of claim 1, further comprising a communications component coupled with the processor and operable to transmit location information corresponding to the current geographic location of the apparatus to a portable navigation unit for comparison of the location information with at least one boundary stored in the memory of the portable navigation unit.

14. An animal indicator apparatus operable to be worn by an animal, the apparatus comprising:
    a location determining component operable to determine a current geographic location of the apparatus;
    memory operable to store cartographic data including data representative of a plurality of roads;
    an indicator including a light-emitting device; and
    a processor coupled with the location determining component, the memory, and the indicator, the processor operable to activate the indicator when the current geographic location of the apparatus is near the location of one of the roads;
    wherein the processor varies an intensity or blinking rate of the light-emitting device as a function of a distance between the current geographic location of the apparatus and the location of one of the roads.

15. The apparatus of claim 14, wherein the light emitting device does not blink at a first distance between the current geographic location of the apparatus and the location of the boundary and blinks at a second distance between the current geographic location of the apparatus and the location of the boundary, the second distance being lesser than the first distance.

16. The apparatus of claim 15, wherein the processor increases the intensity or blinking rate of the light-emitting device as the current geographic location of the apparatus approaches the location of one of the roads and decreases the intensity or blinking rate of the light-emitting device as the current geographic location of the apparatus gets further from the location of one of the roads.

17. The apparatus of claim 16, wherein the processor increases both the intensity and the blinking rate of the light-emitting device as the current geographic location of the apparatus approaches one of the roads.

18. The apparatus of claim 14, further comprising a communications component coupled with the processor and operable to transmit location information corresponding to the current geographic location of the apparatus when the current geographic location of the apparatus approaches the location of one of the roads.

19. The apparatus of claim 14, wherein the location determining component comprises a Global Positioning System (GPS) receiver and utilizes received GPS signals to determine the current geographic location of the apparatus.

20. The apparatus of claim 14, further comprising;
a housing to house at least portions of the location determining component, the indicator, the memory, and the processor; and
a collar operable to couple with the housing and be secured around the animal's neck.

21. The apparatus of claim 14, further including a user interface operable to select one or more of the roads, wherein the processor is operable to activate the indicator when the current geographic location of the apparatus is near the location of one of the selected roads.

22. The apparatus of claim 14, further including a user interface operable to select one or more road classifications, wherein the processor is operable to activate the indicator when the current geographic location of the apparatus is near the location of one of the roads corresponding to the selected road classifications.

23. The apparatus of claim 14, wherein the light-emitting device includes a plurality of light-emitting diodes.

24. The apparatus of claim 14, wherein the data representative of a plurality of roads is geographic coordinates.

25. The apparatus of claim 14, wherein the data representative of a plurality of roads is user-defined.

26. The apparatus of claim 14, further comprising a communications component coupled with the processor and operable to transmit location information corresponding to the current geographic location of the apparatus to a portable navigation unit for comparison of the location information with cartographic data stored in the memory of the portable navigation unit representative of geographic locations of interest.

* * * * *